(12) United States Patent
Dallan

(10) Patent No.: US 11,850,678 B2
(45) Date of Patent: Dec. 26, 2023

(54) PLANT FOR PROCESSING SHEET METAL, EQUIPPED WITH AN IMAGE ACQUISITION APPARATUS, AND A METHOD FOR ACQUIRING IMAGES OF SHEET METAL EDGES IN SAID PLANT

(71) Applicant: DALLAN S.P.A., Treviso (IT)

(72) Inventor: Andrea Dallan, Treviso (IT)

(73) Assignee: DALLAN S.P.A., Treviso (IT)

( * ) Notice: Subject to any disclaimer, the term of this patent is extended or adjusted under 35 U.S.C. 154(b) by 179 days.

(21) Appl. No.: 17/591,220

(22) Filed: Feb. 2, 2022

(65) Prior Publication Data

US 2022/0241834 A1    Aug. 4, 2022

(30) Foreign Application Priority Data

Feb. 3, 2021    (IT) .......................... 102021000002351

(51) Int. Cl.
*B23K 26/03*    (2006.01)
*B21D 43/00*    (2006.01)

(52) U.S. Cl.
CPC ............ *B23K 26/032* (2013.01); *B21D 43/00* (2013.01)

(58) Field of Classification Search
CPC .............................. B23K 26/032; B21D 43/00

USPC ..................................................... 348/88, 86
See application file for complete search history.

(56) References Cited

U.S. PATENT DOCUMENTS

| 5,132,791 A | * | 7/1992 | Wertz ................ G01N 21/8903 |
| | | | 250/559.46 |
| 8,192,050 B2 | | 6/2012 | Ido et al. |
| 2015/0355104 A1 | | 12/2015 | Matsuda |
| 2018/0126486 A1 | | 5/2018 | Dallan |

FOREIGN PATENT DOCUMENTS

JP    2012083282 A    4/2012

* cited by examiner

*Primary Examiner* — Sherrie Hsia
(74) *Attorney, Agent, or Firm* — ArentFoxSchiff LLP; Michael Fainberg

(57) ABSTRACT

The present invention relates to a plant for processing sheet metal, comprising a conveyor for moving sheet metal; at least one image acquisition apparatus placed above a horizontal plane defined by said conveyor. The apparatus in turn comprises a camera comprising a lens; first moving means for moving the camera parallel to the horizontal plane; an illuminator that is placed beneath the camera and is equipped with a plurality of light sources to illuminate a portion of said horizontal plane located beneath the camera. Said apparatus further comprises second moving means for moving said illuminator with respect to said camera perpendicularly to said horizontal plane supporting the sheet metal.

11 Claims, 9 Drawing Sheets

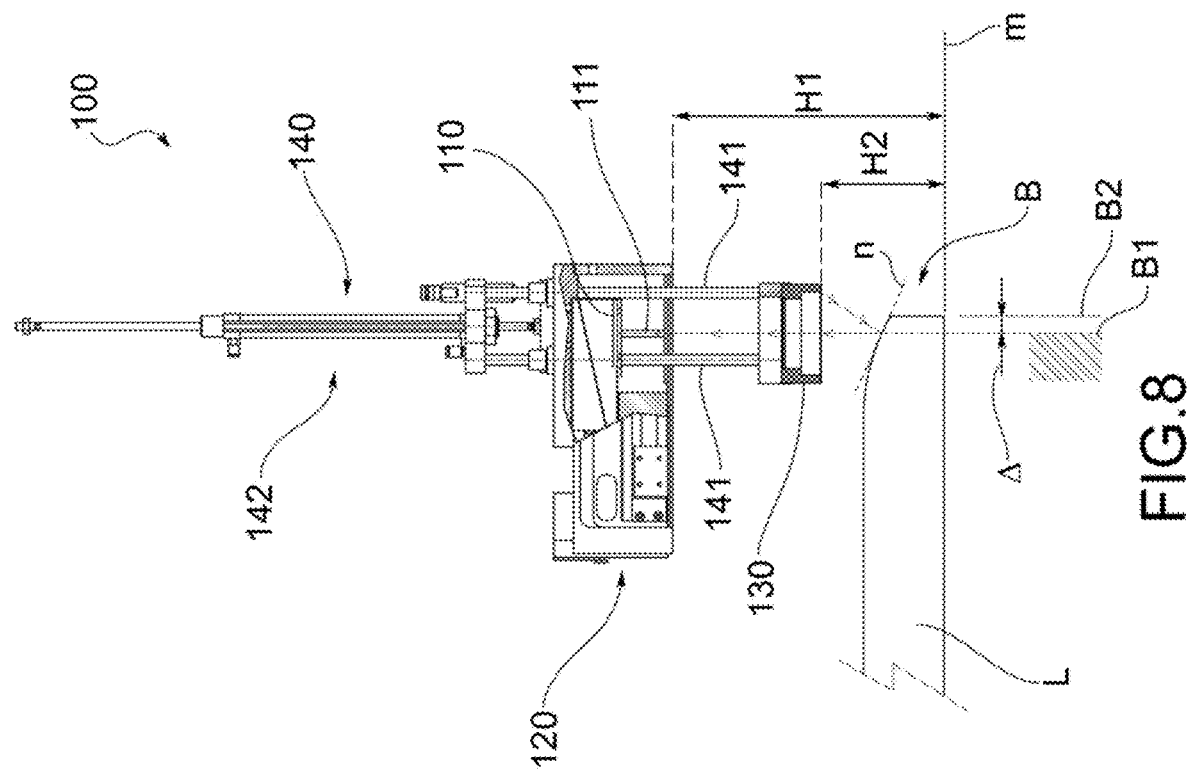
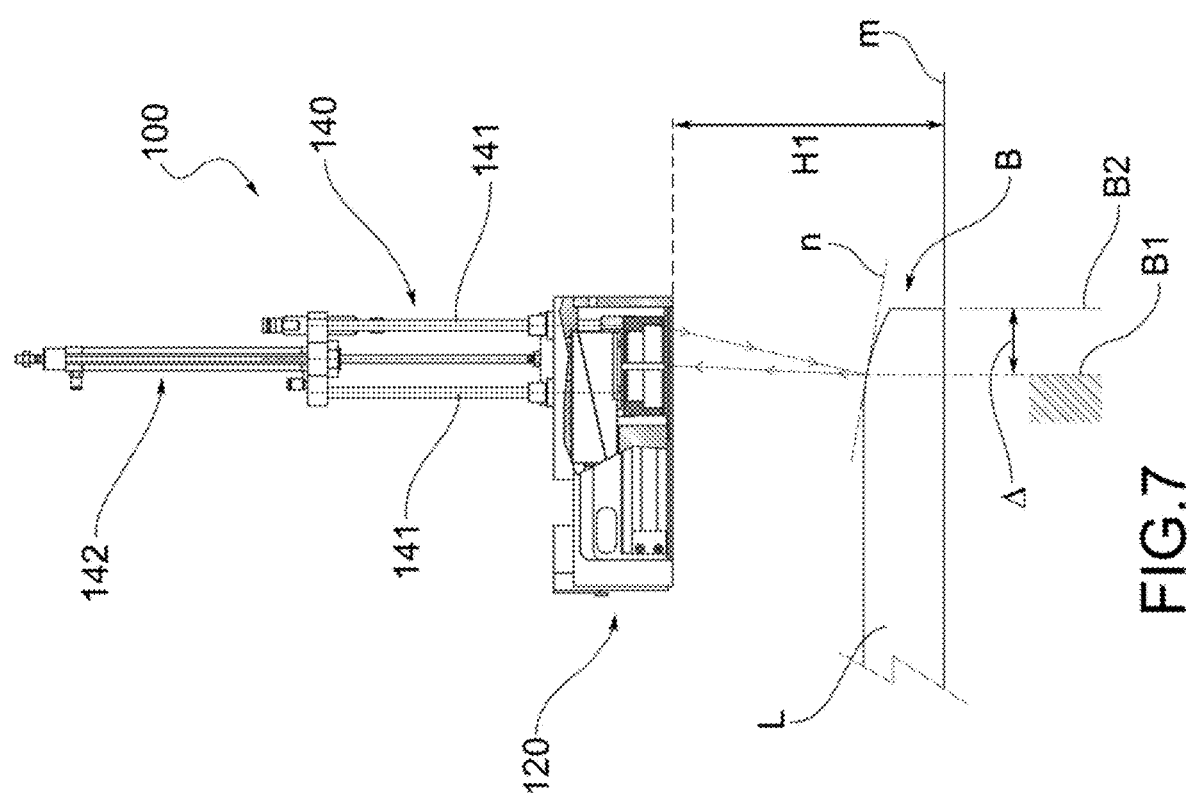

PLANT FOR PROCESSING SHEET METAL, EQUIPPED WITH AN IMAGE ACQUISITION APPARATUS, AND A METHOD FOR ACQUIRING IMAGES OF SHEET METAL EDGES IN SAID PLANT

CROSS-REFERENCE TO RELATED APPLICATION

This application claims priority to Italian Patent Application No. 102021000002351 filed on Feb. 3, 2021, the entire contents of which is hereby incorporated in its entirety by reference.

FIELD OF THE INVENTION

The present invention relates to a plant for processing sheet metal, equipped with an image acquisition apparatus, and a method for acquiring images of sheet metal edges in said plant.

In particular, the sheet metal processing plant according to the invention is equipped with a laser cutting station.

Advantageously, the image acquisition apparatus may be integrated into the entrance of said sheet metal processing plant for the purpose of working on sheet metal fed into the plant, or, in combination or alternatively, may be integrated into various other points of the plant.

In particular, the image acquisition apparatus according to the invention may be placed in a laser cutting station of the plant or be placed downstream of stations for mechanically cutting the sheet metal, working, for example, shears or punches.

BACKGROUND OF INVENTION

It is known that it is essential in sheet metal processing plants to very precisely detect the position of the sheet metal along the production line. Indeed, such detection affects the precision of the processing performed on the sheet metal along the plant.

This problem is particularly acute in sheet metal processing plants with laser cutting stations, since they are intended to operate at a high or very high level of precision. Errors in detecting the position of the sheet metal may indeed compromise and possibly completely negate the precision of the laser cut.

Such detection is achieved by photographically scanning the edges of the sheet metal.

To that end, sheet metal processing plants are equipped with vision or image acquisition apparatuses intended to detect the position of the edges of the sheet metal within a coordinate system in the plant. In particular, such vision apparatuses may be integrated into a plant control system as described, for example, in European patent EP 3310520 B1 filed in the name of the same patent holder.

In greater detail and as shown schematically in FIG. 4, a vision or image acquisition apparatus comprises:
- a camera F, which is capable of taking images corresponding to a predefined section of the plant and is placed at a predefined height H1 above the area where the sheet metal L passes, defined by a plane m on which the sheet metal rests; and
- an illuminator G, connected in a fixed manner beneath the lens O of the camera, to illuminate the area of the plant subjected to photographic scanning by the camera.

The illuminator G in turn comprises a plurality of light sources S and a diffuser (not shown) suitable to make the light emitted by the light sources uniform. The light sources are configured so as to emit light with cones having substantially vertical Z-axes, that is, orthogonal to the upper surface of the sheet metal. The illuminator G is equipped with an opening centered on the camera lens O to allow the camera to receive the light reflected by the object being scanned.

The apparatus further comprises means M for moving the camera, capable of moving the camera F with the associated illuminator G parallel to the upper surface of the sheet metal L, keeping it at said predefined height H1 from the latter.

Operatively, in order to acquire the position of the edge of a sheet metal, the camera performs a photographic scan of the sheet metal against a dark background. The acquired image therefore ends up being a demarcation line D between a light band and a dark band, in which the light band FC represents the material while the dark band FS represents the background, as shown schematically in FIG. 1. Since the background is inevitably black (being out of focus and reflecting little light), the exposure is set so that the material is sufficiently light so as to create a light-to-dark transition gradient as marked as possible, to obtain a stable result even with disturbances of the environmental and/or material conditions.

However, it has been found that the image acquisition apparatuses described above have significant operational limitations when used to scan sheet metal edges defined by deformed and rounded corners, that is, having a curved surface and not one defined by a clear intersection of two surfaces at 90°. As shown schematically in FIG. 4, the deformed corner may be assimilated to a plurality of reflecting planes n at an angle with respect to horizontal, which divert the light coming from the illuminator and reflected by the edge away from the lens O.

In particular, such situations occur when sheet metal is scanned, for example sheet metal made of non-tempered steel with edges made by means of mechanical cutting, such as by shears, circular saws, or punches. Because of the ductility of the material, the upper area of the edge has a roundedness created by the elastic yield of the material when subjected to the cutting force. FIG. 2 schematically shows a cross-sectional view of a typical cut edge T of a sheet metal L, where A indicates the rounded surface of the edge, B indicates the cut area along the thickness S of the sheet metal, and C indicates the lower burr caused by the cut. The greater the thickness of the sheet metal and the more plastic the material, the larger the rounded surface of the edge. This phenomenon is particularly accentuated with sheet metals thicker than 2 mm.

Traditional image acquisition apparatuses are not capable of precisely detecting the actual edge BR of the sheet metal, thus introducing significant errors between the position of the actual edge B2 and the position of the detected edge B1. Generally, the position of the detected edge B1 is set back by many tenths of a millimeter compared to the position of the actual edge. It has therefore been found that traditional apparatuses are incapable of correctly detecting the position of a rounded edge.

FIG. 3 shows an image of a sheet metal edge obtained by means of a traditional acquisition apparatus, where B1 indicates the detected edge and B2 indicates the actual edge, while Δ represents the difference between the actual edge and the detected edge.

In addition, problems with scanning repeatability have been noted with traditional apparatuses.

The position errors of sheet metal edges introduced by traditional acquisition apparatuses are not negligible, being on the order of many tenths of a millimeter. This problem is particularly acute in sheet metal processing plants with laser cutting stations, intended to operate at a high or very high level of precision. Errors in detecting the position of the sheet metal may indeed compromise and possibly completely negate the precision of the laser cut.

There is consequently a need in the field of sheet metal processing to have plants equipped with sheet-metal-edge image acquisition apparatuses that achieve more precise detection of the position of the edges than traditional apparatuses.

SUMMARY OF THE INVENTION

Consequently, the main purpose of the present invention is to eliminate, in whole or in part, the drawbacks of the aforementioned prior art by providing a sheet metal processing plant equipped with an image acquisition apparatus that achieves more precise detection of the position of the edges than traditional apparatuses.

Another purpose of the present invention is to provide a sheet metal processing plant equipped with an image acquisition apparatus that is operatively simple to control.

Another purpose of the present invention is to provide a sheet metal processing plant equipped with an image acquisition apparatus that can be built for a cost comparable to that of traditional apparatuses.

BRIEF DESCRIPTION OF THE DRAWINGS

The technical features of the invention, according to the aforementioned purposes, are clearly found in the content of the claims below, and the advantages of the invention will become more readily apparent in the following detailed description given in reference to the accompanying drawings, which illustrate one or more purely exemplary and non-limiting embodiments thereof, in which:

FIGS. 7 and 8 show an image acquisition apparatus according to the invention in two different operating positions;

DETAILED DESCRIPTION

Figure 1:
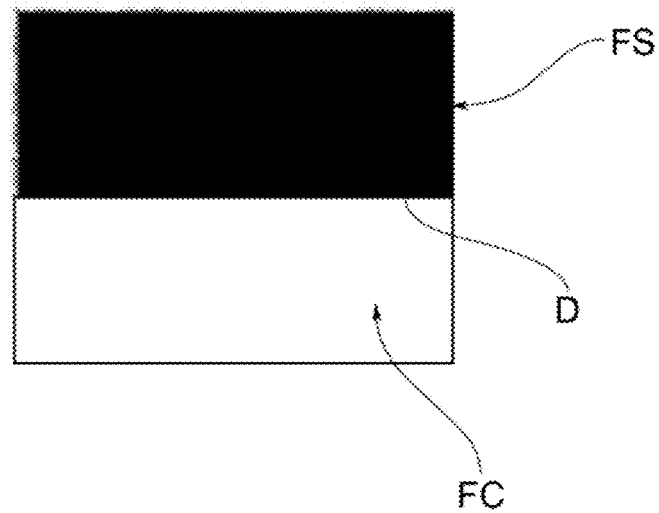
FIG. 1 shows a schematic representation of the result of a photographic scan of a sheet metal edge by an image acquisition apparatus.
Figure 2:
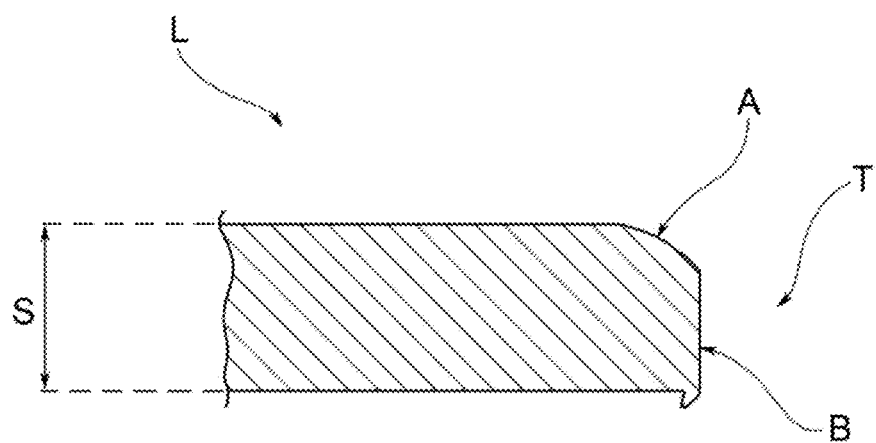
FIG. 2 shows a cross-sectional schematic representation of a sheet metal edge obtained by mechanical cutting.

The sheet metal processing plant according to the invention is indicated as a whole with the number 1 in the enclosed figures and the image acquisition apparatus is indicated as a whole with the number 100.

Here and in the remainder of the description and claims, reference will be made to the plant 1 and the apparatus 100 in use condition. Therefore, any references to a lower or upper position or to a horizontal or vertical orientation should be interpreted in such condition.

According to a general embodiment of the invention, the plant 1 comprises a conveyor 10 for moving a piece of sheet metal within the plant 1. Said conveyor defines a horizontal plane m supporting the sheet metal.

The conveyor 10 may be any device suitable for the purpose, for example a conveyor belt with a spike bed.

Figure 13:
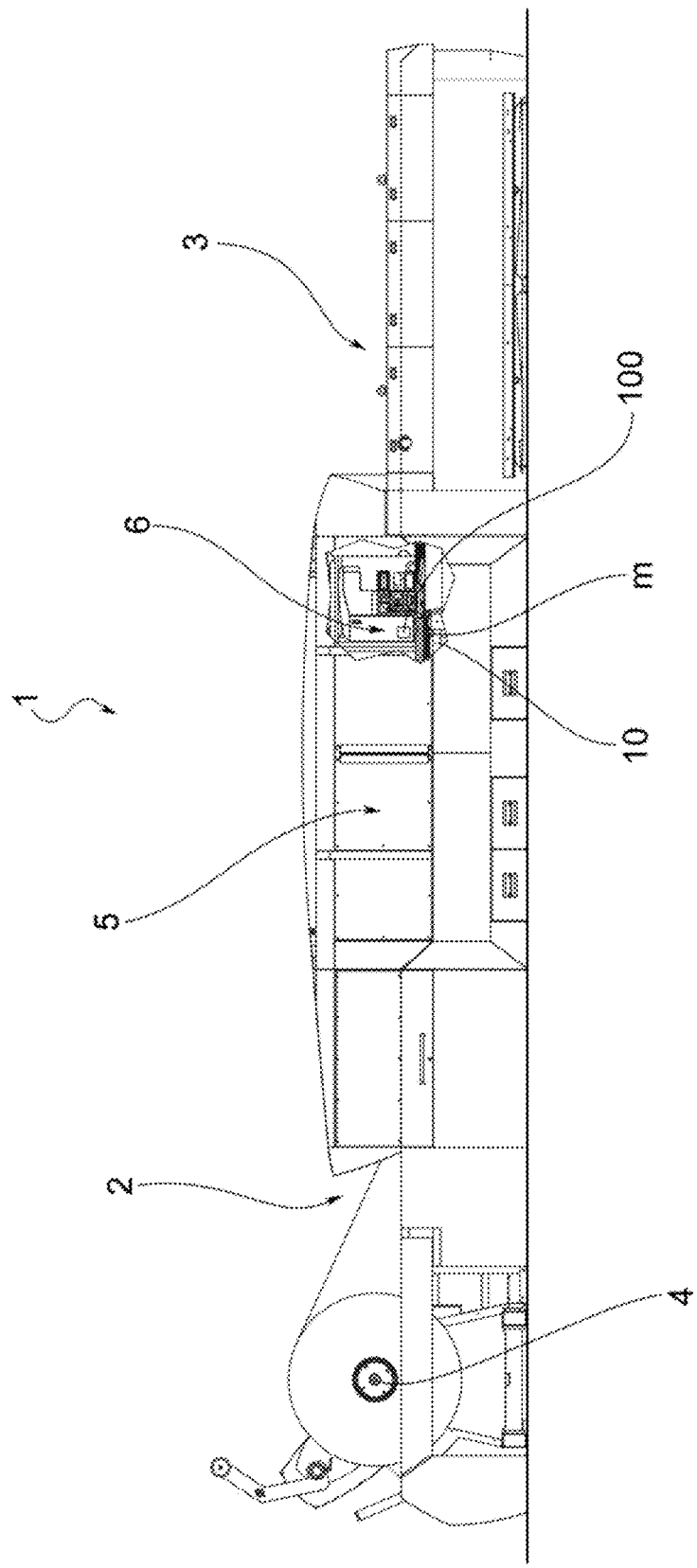
FIG. 13 shows a sheet metal processing plant comprising an image acquisition apparatus according to the invention.

In particular, as shown in FIG. 13, the conveyor 10 may be configured to move the sheet metal from an entrance 2, where the sheet metal to be processed is fed in, to an exit 3 through which the processed sheet metal exits.

The plant 1 may be configured to process individual pieces of sheet metal or sheet metal from a coil. In the latter case, as shown in FIG. 13, the plant 1 is equipped with a reel 4 at the entrance 1 for feeding a band of sheet metal in coil form.

Between the entrance 2 and the exit 3 the plant comprises one or more sheet metal processing stations 5. Advantageously, the aforementioned one or more processing stations 5 may be configured to perform any type of processing, from laser cutting to punching.

Preferably, as shown in FIG. 13, the sheet metal processing plant according to the invention is equipped with a laser cutting station 5, which in particular comprises at least one laser cutting head 6 which is moved, for example, by a three-axis moving system.

The plant 1 comprises at least one image acquisition apparatus 100 arranged above said horizontal plane m for supporting sheet metal, and is configured to perform photographic scans of the edges B of the sheet metal L which are placed on said conveyor 10 during use.

Preferably, the aforementioned image acquisition apparatus 100 is integrated into a plant control system as described, for example, in European patent EP 3310520 B1 filed in the name of the same applicant, the description of which is fully incorporated herein by reference.

Advantageously, the image acquisition apparatus 100 may be arranged at the entrance 2 of said sheet metal processing plant 1 for the purpose of working on the sheet metal fed into the plant, or, in combination or alternatively, may be integrated into various other points of the plant.

Advantageously, as shown in FIG. 13, the image acquisition apparatus 100 may be arranged in a laser cutting station 5 of the plant and be slaved thereto.

In particular, the image acquisition apparatus 100 may be placed downstream of a possible sheet metal mechanical cutting station using, for example, shears or punches, for the purpose of photographically scanning the edges of the sheet metal resulting from the mechanical cutting so as to enable quality and/or position verifications of the sheet metal after processing.

Figure 5:
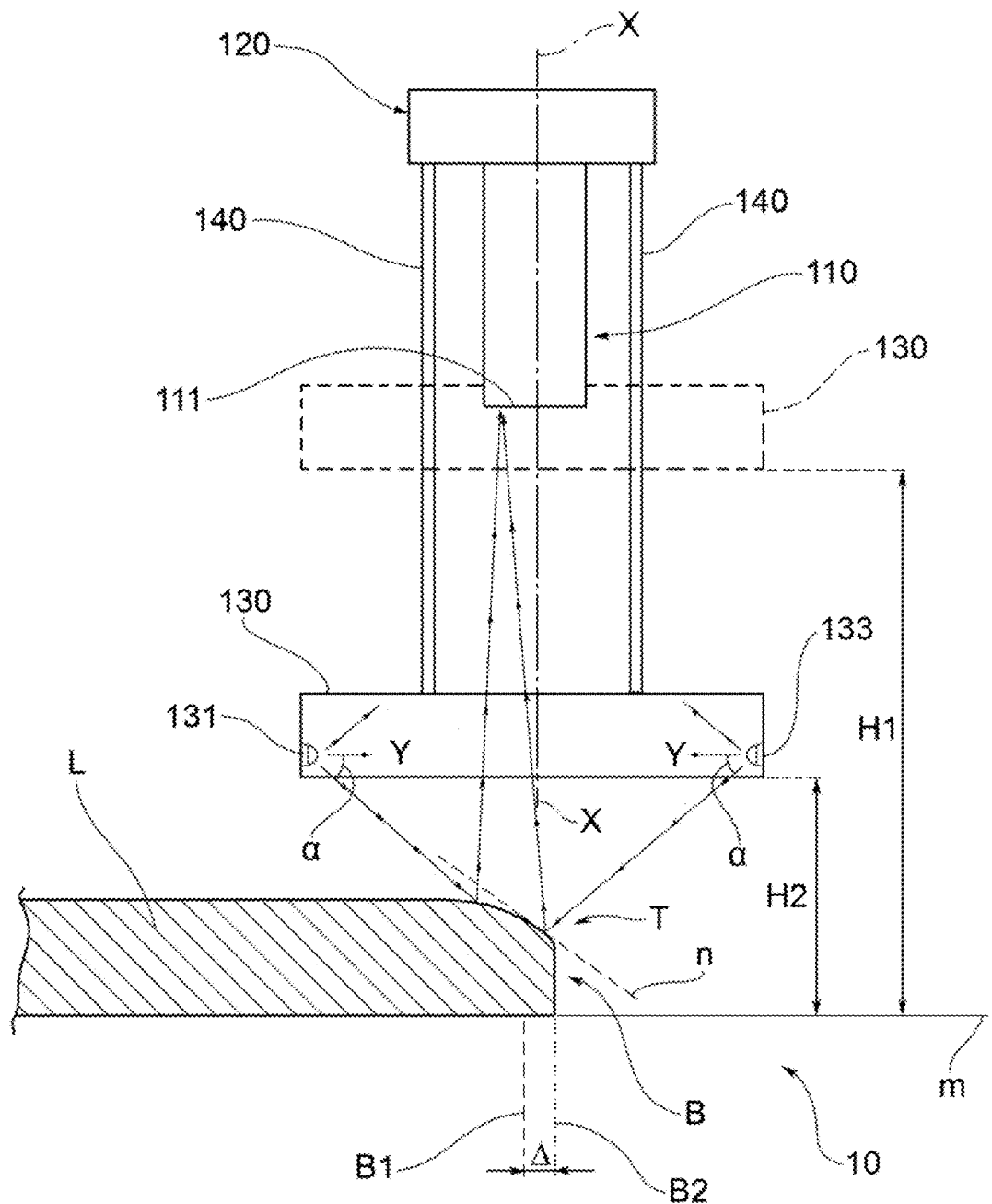
FIG. 5 shows a schematic view of a sheet-metal-edge image acquisition apparatus according to the invention.

As shown schematically in FIGS. 5, 7, and 8, the aforementioned at least one image acquisition apparatus 100 in turn comprises:

a camera 110 comprising a lens (111) pointing toward said horizontal plane m supporting the sheet metal, with the optical axis X arranged vertically; and first moving means 120 for moving said camera 110 parallel to said horizontal plane m.

The camera 110 may be of any type suitable for the purpose.

Preferably, the camera 110 is held in a fixed position at a predefined height from the horizontal plane m supporting the sheet metal. In particular, the height position of the camera 110 may be determined so that it is operated under safe conditions in relation to the movements of the underlying sheet metal. This significantly simplifies the operational control of the camera 110.

The first moving means 120 may be of any type suitable for the purpose, for example a two-axis system.

The aforementioned at least one image acquisition apparatus 100 further comprises an illuminator 130, which is arranged beneath the camera 110 and is equipped with a plurality of light sources 131, 132, 133, and 134 to illuminate a portion of said horizontal plane m lying beneath the camera 110.

Figure 9:
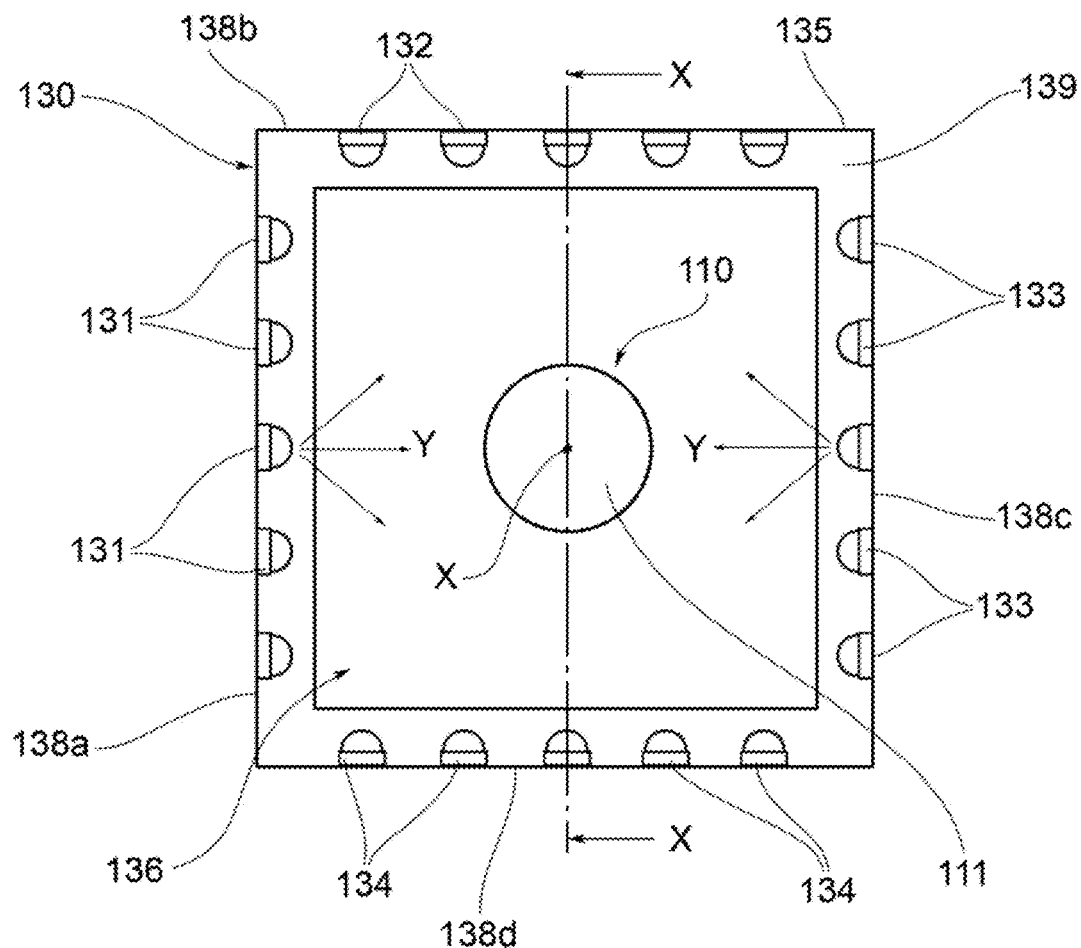
FIG. 9 shows a top orthogonal schematic view of an illuminator of an image acquisition apparatus according to a first embodiment of the invention.
Figure 11:
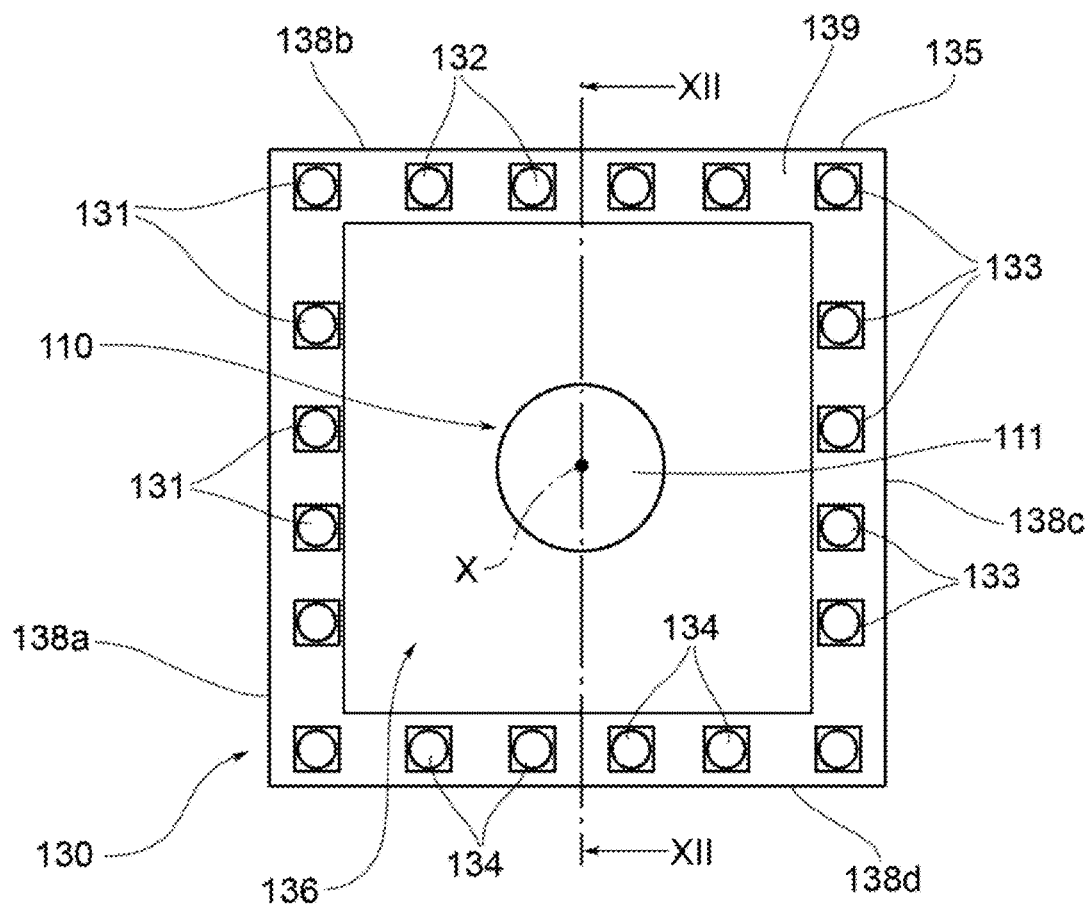
FIG. 11 shows a top orthogonal schematic view of an illuminator of an image acquisition apparatus according to a second embodiment of the invention.

As shown for example in FIGS. 9 and 11, the light sources 131, 132, 133, and 134 are distributed about the optical axis X of said lens 111.

The aforementioned illuminator 130 may be moved parallel to the horizontal plane m together with said camera 110.

Preferably, as shown in FIGS. 7 and 8, the aforementioned illuminator 130 is integral to the camera 110 in the latter's movements parallel to the horizontal plane m.

According to the invention, the image acquisition apparatus 100 further comprises second moving means 140 for moving the illuminator 130 with respect to the camera 110 perpendicularly to the aforementioned horizontal plane m supporting the sheet metal.

In particular, these second moving means 140 are suitable to move the illuminator 130 between:

a raised position, in which the illuminator 130 is placed near the camera 110 at a first predefined height H1 with respect to the horizontal plane m (see FIG. 7), and a lowered position, in which the illuminator 130 is placed near the horizontal plane m at a second predefined height H2 that is less than the first height H1 (see FIG. 8).

Thanks to the invention, the height position of the illuminator 130 with respect to the horizontal plane m supporting the sheet metal may be set independently of the camera 110. In this way it is possible, in particular, to bring the light sources of the illuminator 130 close to the horizontal plane m during the photographic scan so as to ensure better illumination of the edges B of the sheet metal L and thereby improve the optical detection sensitivity of the camera 110.

In particular, from an operational standpoint, the aforementioned second predefined height H2 is chosen as a function of the maximum aperture angle α of the light beams emitted by said illuminator 130 so that, with the illuminator placed at said second predefined height H2, the light emitted by the illuminator laterally illuminates the edges of the sheet metal directly, and the light reflected by the edge of the sheet metal is captured by the lens of said camera.

As shown schematically in FIGS. 7 and 8, it has been possible to confirm experimentally that by bringing the illuminator 130 close to the edge of the sheet metal during the photographic scan, edge images are obtained in which the position error Δ between the actual edge B2 and the detected edge B1 is reduced. In this way it is possible to obtain a more precise detection of the edge position than with traditional apparatuses.

Advantageously, thanks to the presence of the aforementioned second moving means 140, the illuminator 130 may be brought close to the camera 110, that is, placed in a safe position further away from the horizontal plane m when the edges are not being photographically scanned and there is no need to illuminate the horizontal plane m.

According to the embodiment shown in FIGS. 7 and 8, the second moving means 140 may comprise:

a plurality of vertical rods 141 slidingly supporting the illuminator 130 so as to guide it in the vertical movements with respect to the camera 110; and an actuator 142 (for example, a pneumatic cylinder) capable of acting (directly or indirectly) on the illuminator 130 so as to cause the controlled sliding thereof along said rods 141.

According to a preferred embodiment of the invention shown in the appended figures, the plurality of light sources 131, 132, 133, and 134 of said illuminator 130 are configured so that said illuminator emits light beams having a substantially horizontal axis.

Thanks to this configuration of the light sources, being the distance of the illuminator from the horizontal plane m equal, the quantity of light that directly hits the edge of the sheet metal significantly increases, compared to the (non-preferred) case in which the plurality of light sources 131, 132, 133, and 134 of said illuminator 130 are configured so that said illuminator emits light beams having a substantially vertical axis.

Here and in the remainder of the description and claims, "laterally" refers to the edge portion of the sheet metal which develops on surfaces that are not parallel to the upper surface of the sheet metal.

Figure 6:
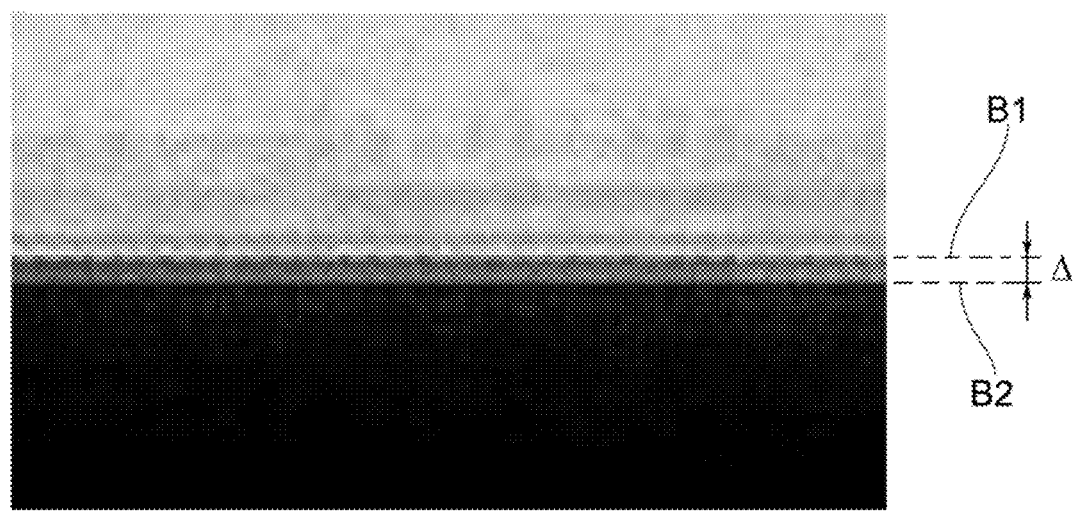
FIG. 6 shows a photograph of a sheet metal edge obtained by photographic scanning of a sheet metal edge using an image acquisition apparatus according to the invention.
Figure 4:
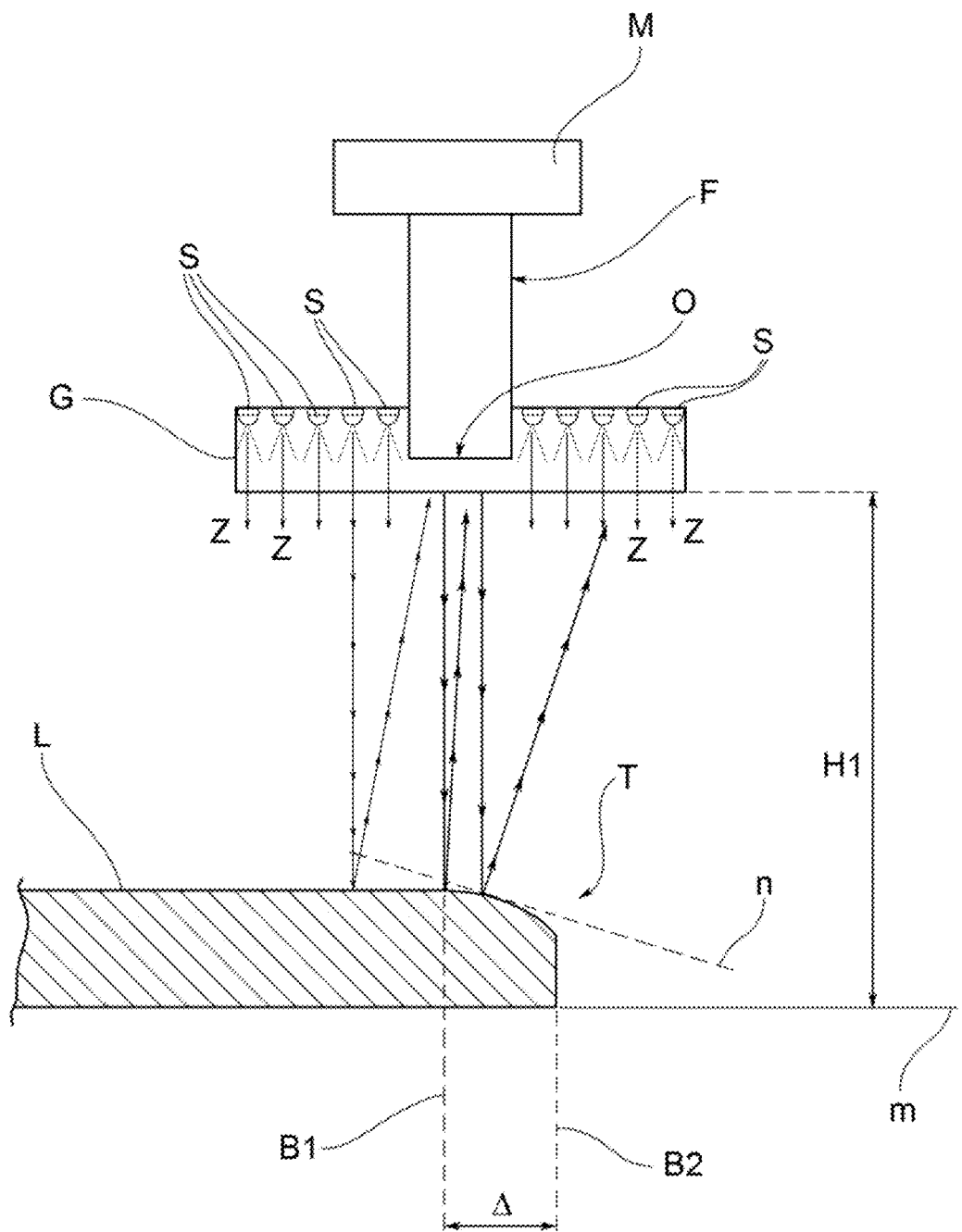
FIG. 4 shows a schematic view of a traditional sheet-metal-edge image acquisition apparatus.

FIG. 6 shows a photograph of a sheet metal edge obtained by photographic scanning of a sheet metal edge using an image acquisition apparatus according to the invention. In particular, the photograph in FIG. 6 was taken with an apparatus according to the invention, in which:

the illuminator 130 has been brought close to the horizontal plane m in relation to the camera; and the plurality of light sources 131, 132, 133, and 134 of the illuminator 130 are configured so that the illuminator emits light beams having a substantially horizontal axis.

Figure 3:
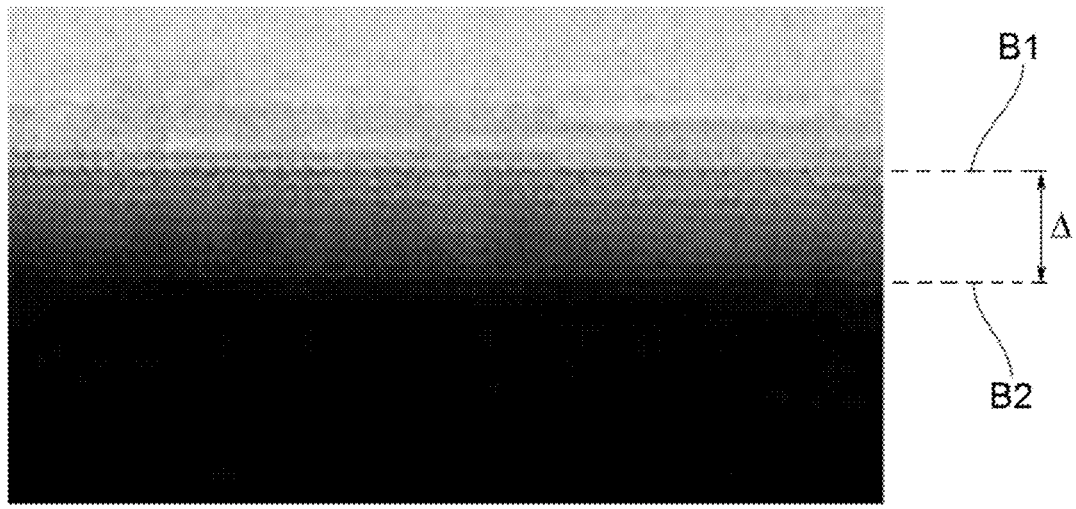
FIG. 3 shows a photograph of a sheet metal edge obtained by photographic scanning of a sheet metal edge using a traditional image acquisition apparatus.

FIG. 3 shows a photograph of the same edge of the sheet metal taken in photograph 6. The photograph in FIG. 3 was made with a traditional image acquisition apparatus, in which:

the illuminator is located (fixed) at the same height as the camera; and the plurality of light sources of the illuminator 130 are configured so that the illuminator emits light beams having a substantially vertical axis.

Both photographs 3 and 6 were taken using the same camera positioned at the same height and using two illuminators having the same light output.

It is possible to observe from a comparison of photographs 3 and 6 that the difference (error) Δ between the detected edge B1 and the actual edge B2 is significantly smaller in photograph 6, confirming the fact that the image acquisition apparatus 100 according to the invention achieves greater precision in detecting the edge position than a traditional apparatus. The position errors of sheet metal edges introduced by the acquisition apparatus according to the invention are less than one tenth of a millimeter.

Advantageously, as shown in particular in FIGS. 9 and 11, the aforementioned illuminator 130 comprises an annular containment body 135 that centrally delimits an aperture 136 axially aligned with the optical axis X of the lens 111 of the camera 110. The light sources 131, 132, 133, and 134 are associated with the annular body 135.

Preferably, the light sources 131, 132, 133, and 134 are distributed over a horizontal plane along the perimeter of said aperture 136 so as to be distributed about the optical axis X of the lens 111 of the camera 110. In this way the illuminator 130 generates light beams on the plane of the aperture from every direction, providing diffuse lighting of the horizontal plane m supporting the sheet metal, lying beneath the camera 110.

Figure 10:
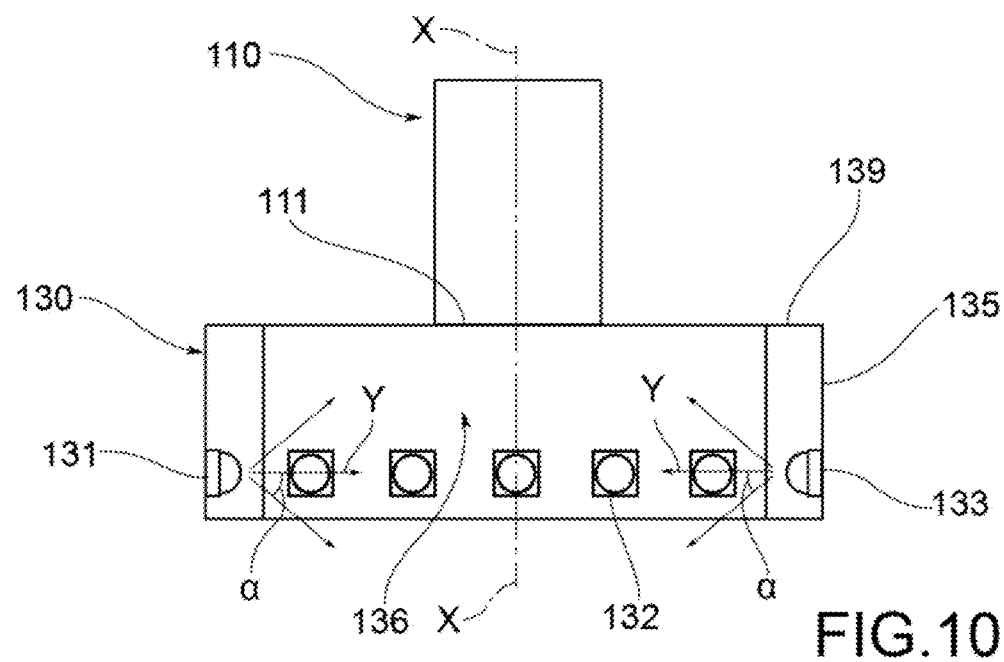
FIG. 10 shows a cross-sectional orthogonal schematic view of the illuminator in FIG. 9 along the cross-sectional plane X-X thereof.

The plurality of light sources 131, 132, 133, and 134 of said illuminator 130 may be directed into said annular body 135 so as to directly generate light beams having a horizontal axis, as shown in FIGS. 9 and 10.

Figure 12:
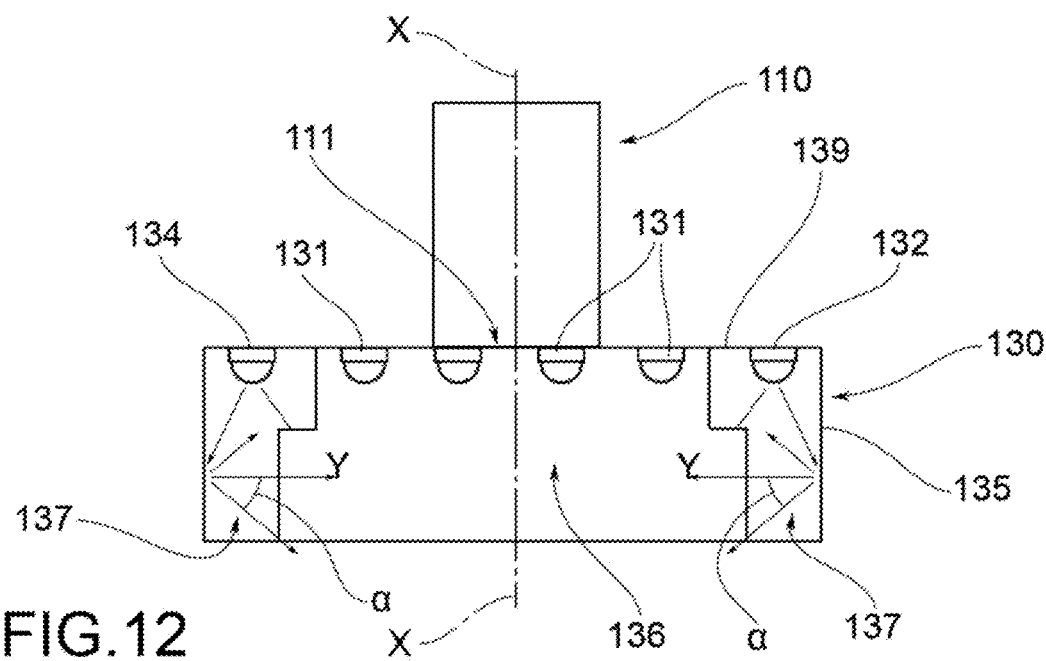
FIG. 12 shows a cross-sectional orthogonal schematic view of the illuminator in FIG. 11 along the cross-sectional plane XII-XII thereof.

Alternatively, as shown schematically in FIGS. 11 and 12, the aforementioned illuminator 130 comprises one or more light guides 137 that are associated with the annular body 135 and are configured so as to generate, with the light emitted from said light sources, light beams exiting the illuminator with a horizontal axis. In this case, the light sources 131, 132, 133, and 134 do not necessarily need to be directed into said annular body 135 so as to directly generate light beams having a horizontal axis, but may be oriented so as to generate light beams with a non-horizontal axis, which are emitted in output as light beams with a horizontal axis thanks to the light guides 137.

According to an especially preferred embodiment shown in the appended figures, the aforementioned annular body 135 has a quadrangular shape with respect to a horizontal cross-sectional plane. The annular body 135 may have a rectangular or square shape.

Advantageously, the aforementioned light sources 131, 132, 133, and 134 are distributed on four sides of the annular body 135, preferably evenly.

Operatively, thanks to this configuration of the annular body 135, the light sources 131, 132, 133, and 134 of said illuminator 130 form groups of sources, each having a linear distribution.

From an operational standpoint, this may be particularly advantageous in the (very common) case in which photographic scans of sheet metal edges with straight portions need to be taken. In use, as shown in particular in FIG. 14, the apparatus 100 may indeed be oriented in such a way that a group of sources is arranged parallel to the straight edge portion to be scanned. In this way, more uniform illumination of the edge portion is obtained, further improving the precision of the photographic scan.

Preferably, as shown in FIGS. 9 to 12, the annular body 135 of the illuminator 130 is defined by four perimeter walls 138a, b, c, and d arranged vertically about the aperture 136. These perimeter walls are connected at the top by a quadrangular frame 139 that develops around the aperture 136, defining a horizontal surface.

As shown in FIGS. 9 and 10, the aforementioned light sources 131, 132, 133, and 134 may be directly associated with said lateral walls. In this case, the light sources 131, 132, 133, and 134 are preferably directed into said annular body 135 so as to directly generate light beams having a horizontal axis.

Alternatively, as shown in FIGS. 11 and 12, the aforementioned light sources 131, 132, 133, and 134 are directly associated with said quadrangular frame 139. In this case, the light sources 131, 132, 133, and 134 are preferably directed into said annular body 135 so as to generate light beams having a vertical axis. These light beams are converted at the output of the illuminator into beams with a horizontal axis by means of said light guides 137.

Advantageously, according to an embodiment not shown in the appended figures, said illuminator 130 may comprise a diffuser to make the light emitted by said light sources uniform.

Preferably, said light sources consist of LEDs. Preferably, the LEDs are red because, compared to LEDs of other colors, they achieve a greater reduction of the optical effects caused by light reflections on metal surfaces.

The present invention relates to a method for acquiring images of sheet metal edges in a plant 1 for processing sheet metal according to the present invention, and in particular as described above.

According to a general embodiment, the method for acquiring images of sheet metal edges comprises the following operating steps:

a) bringing a portion of sheet metal L close to said image acquisition apparatus 100 by means of said conveyor 10;

b) moving said illuminator 130 from said raised position to said lowered position by means of said second moving means 140 so as to bring it close to said portion of sheet metal;

c) performing a photographic scan of the edges of said portion of sheet metal by moving the camera 110 and the associated illuminator 130 parallel to said horizontal plane m supporting the sheet metal, by means of said first moving means, and keeping said illuminator in the lowered position.

The aforementioned predefined second height H2 is chosen according to the maximum angle of aperture a of the light beams emitted by said illuminator 130 so that, when the illuminator is placed at said predefined second height H2, the light emitted by the illuminator can illuminate the edges of the sheet metal laterally and the light reflected by the edge of the sheet metal is captured by the lens 111 of said camera 110.

According to a preferred embodiment of the method, the apparatus 100 has the following features:

the plurality of light sources 131, 132, 133, and 134 of said illuminator 130 are configured so that said illuminator emits light beams having a substantially horizontal axis; and said illuminator 130 comprises an annular containment body 135 that centrally delimits an aperture 136 axially aligned with the optical axis X of the lens 111 of the camera 110, and has a quadrangular shape with respect to a horizontal cross-sectional plane;

said light sources 131, 132, 133, and 134 are associated with said annular body 135 and distributed on four sides of said annular body.

Figure 14:
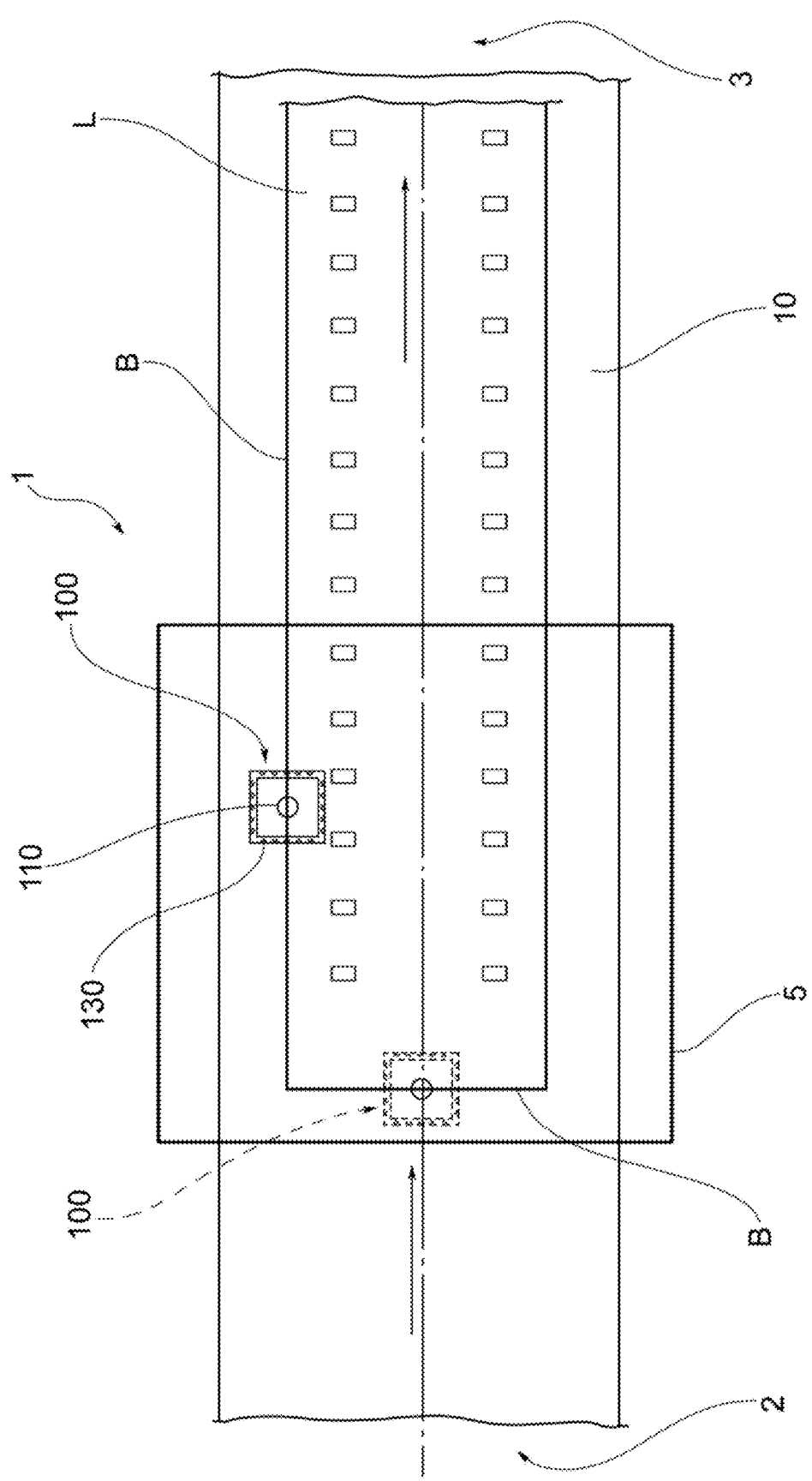
FIG. 14 shows a simplified plan view of a cross section of the plant in FIG. 13, in which the image acquisition apparatus is placed, shown according to a preferred way of using the apparatus, along the edges of a sheet metal so as to perform a photographic scan.

As shown in FIG. 14, during step c) in which an edge of said sheet metal portion is scanned photographically, the illuminator 130 with the associated camera 110 is oriented about the optical axis X of the camera so as to be arranged astride said sheet metal edge, with two opposite sides of said annular body being substantially parallel to said edge.

Preferably, the illuminator 130 with the associated camera 110 is oriented about the optical axis X of the camera, with the optical axis X passing close to the edge.

The invention achieves numerous advantages which have already been described in part.

The sheet metal processing plant equipped with an image acquisition apparatus according to the invention provides for more precise detection of the position of the edges compared to traditional image acquisition apparatuses.

The sheet metal processing plant equipped with an image acquisition apparatus according to the invention is operationally simple to control.

The sheet metal processing plant equipped with an image acquisition apparatus according to the invention has a construction cost that is comparable to that of processing plants equipped with traditional apparatuses.

The invention thus conceived therefore achieves its intended purposes.

Obviously, in its practical embodiment, it may also assume forms and configurations that differ from the one described above without exceeding the present scope of protection.

Moreover, all parts may be replaced with technically equivalent ones, and the dimensions, shapes, and materials employed may be of any type depending on the needs.

The invention claimed is:

1. Sheet metal processing plant, comprising:
a conveyor for advancing sheet metal within said plant, said conveyor defining a horizontal plane for supporting the sheet metal;
at least one apparatus for acquiring images placed above said horizontal plane, configured to take photographic scans of the edges of the sheet metal on said conveyor, wherein said at least one apparatus in turn comprises:
a camera, comprising a lens facing said horizontal plane for supporting the sheet metal with a vertically arranged optical axis;
first moving means for moving said camera parallel to said horizontal plane;
an illuminator, which is placed below said camera and is provided with a plurality of light sources for illuminating a portion of said horizontal plane below said camera, said light sources being distributed about the optical axis of said lens,
said illuminator being movable parallel to said horizontal plane together with said camera,
wherein said apparatus further comprises second moving means for moving said illuminator with respect to said camera perpendicularly to said horizontal plane supporting the sheet metal, between a raised position in which said illuminator is placed near said camera at a first predefined height with respect to said horizontal plane, and a lowered position, in which said illuminator is placed near said horizontal plane at a second predefined height lower than said first predefined height.

2. The plant according to claim 1, wherein the plurality of light sources of said illuminator are configured such that said illuminator emits light beams having a substantially horizontal axis.

3. The plant according to claim 2, wherein said illuminator comprises an annular containment body centrally delimiting an aperture axially aligned with the optical axis of the lens of the camera, said light sources being associated with said annular body.

4. The plant according to claim 3, wherein said annular body has a quadrangular shape with respect to a horizontal cross-sectional plane and wherein said light sources are distributed on four sides of said annular body, preferably in a uniform manner.

5. The plant according to claim 2, wherein the plurality of light sources of said illuminator are directed into said annular body so as to directly generate light beams having a horizontal axis.

6. The plant according to claim 2, wherein said illuminator comprises one or more light guides which are associated with said annular body and are configured to generate, with the light emitted by said light sources, light beams having a horizontal axis at the illuminator output.

7. The plant according to claim 1, wherein said illuminator comprises a diffuser for making the light emitted by said light sources uniform.

8. The plant according to claim 1, wherein said light sources consist of LEDs, preferably of red colour.

9. The plant according to claim 1, comprising a laser cutting station comprising at least one laser cutting head, and wherein said apparatus for acquiring images is placed in said laser cutting station.

10. A method for acquiring images of sheet metal edges in a sheet metal processing plant according to claim 1, comprising the following operating steps:
a) bringing a portion of sheet metal into the vicinity of said apparatus for acquiring images by means of said conveyor;
b) moving said illuminator from said raised position to said lowered position by means of said second moving means so as to bring it closer to said portion of sheet metal;
c) performing a photographic scan of the edges of said portion of sheet metal by moving said camera and said illuminator parallel to said horizontal plane supporting said sheet metal, by said first moving means and keeping said illuminator in its lowered position,
wherein said predefined second height is chosen as a function of the maximum angle of aperture of the light beams emitted by said illuminator in such a way that with the illuminator placed at said predefined second height the light emitted by the illuminator can illuminate the edges of the sheet metal directly and the light reflected by the edge of the sheet metal is captured by the lens of said camera.

11. The method according to claim 10, wherein:
the plurality of light sources of said illuminator are configured such that said illuminator emits light beams having a substantially horizontal axis; and
said illuminator comprises an annular containment body centrally delimiting an aperture axially aligned with the optical axis of the lens of the camera and having a quadrangular shape with respect to a horizontal cross-sectional plane, said light sources being associated with said annular body and distributed on four sides of said annular body,
and wherein during said step c) of performing a photographic scan of an edge of said portion of sheet metal, the illuminator with the associated camera is oriented about the optical axis of said camera so as to be arranged astride said edge, preferably with said optical axis passing close to said edge, and with two opposite sides of said annular body substantially parallel to said edge.

* * * * *